(12) United States Patent (10) Patent No.: US 7,836,151 B2
Bellotti et al. (45) Date of Patent: Nov. 16, 2010

(54) METHOD AND APPARATUS FOR FILTERING VIRTUAL CONTENT

(75) Inventors: Victoria Mary Elizabeth Bellotti, San Francisco, CA (US); Diane Schiano, Portola Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 560 days.

(21) Appl. No.: 11/804,326

(22) Filed: May 16, 2007

(65) Prior Publication Data

US 2008/0288573 A1 Nov. 20, 2008

(51) Int. Cl.
    *G06F 15/16* (2006.01)
(52) U.S. Cl. ........................ 709/218; 709/224
(58) Field of Classification Search ......... 709/200–203, 709/217–277
    See application file for complete search history.

(56) References Cited

U.S. PATENT DOCUMENTS

| | | | | |
|---|---|---|---|---|
| 5,493,692 | A | 2/1996 | Theimer et al. | 455/26.1 |
| 5,603,054 | A | 2/1997 | Theimer et al. | 395/826 |
| 5,611,050 | A | 3/1997 | Theimer et al. | 395/200.09 |
| 5,938,721 | A * | 8/1999 | Dussell et al. | 701/211 |
| 6,236,768 | B1 | 5/2001 | Rhodes et al. | 382/306 |
| 7,280,823 | B2 * | 10/2007 | Ternullo et al. | 455/414.4 |
| 7,653,761 | B2 * | 1/2010 | Juster et al. | 710/18 |
| 2002/0039882 | A1 * | 4/2002 | Ternullo et al. | 455/11.1 |
| 2005/0021369 | A1 * | 1/2005 | Cohen et al. | 705/2 |
| 2006/0053378 | A1 * | 3/2006 | Fano et al. | 715/747 |
| 2006/0282312 | A1 * | 12/2006 | Carlson et al. | 705/14 |
| 2007/0067738 | A1 * | 3/2007 | Flynt et al. | 715/810 |
| 2008/0005313 | A1 * | 1/2008 | Flake et al. | 709/224 |
| 2008/0108337 | A1 * | 5/2008 | Pomerantz et al. | 455/414.3 |
| 2008/0133336 | A1 * | 6/2008 | Altman et al. | 705/10 |
| 2008/0172173 | A1 * | 7/2008 | Chang et al. | 701/207 |
| 2008/0248815 | A1 * | 10/2008 | Busch | 455/456.5 |

(Continued)

FOREIGN PATENT DOCUMENTS

JP 200123027 4/2000

(Continued)

OTHER PUBLICATIONS

Publication: "The Stick-E Document: A Framework for Creating Context-Aware Applications", by P.J. Brown, Electronic Publishing, Vol. 9(1), 1-14, Sep. 1996.

(Continued)

*Primary Examiner*—Moustafa M Meky
(74) *Attorney, Agent, or Firm*—Park, Vaughan, Fleming & Dowler LLP; Anthony P. Jones

(57) ABSTRACT

Embodiments of the present invention provide a system that selects virtual content. The system starts by receiving or gathering a set of virtual content that includes context data. Next, the system assigns items of virtual content from the set of virtual content to one or more dimensions of context with increasing levels of specificity of user relevance, with at least one of the dimensions of context having two or more levels of user relevance. The system then selects a subset of the set of virtual content based on one or more levels of specificity of one or more dimensions of context and displays the subset of the virtual content to the user.

26 Claims, 9 Drawing Sheets

U.S. PATENT DOCUMENTS

2009/0077022 A1\*  3/2009  Cuthbert .................. 707/3

FOREIGN PATENT DOCUMENTS

| JP | 2001265809 | 9/2001 |
| --- | --- | --- |
| JP | 2002108918 | 4/2002 |
| JP | 2002342367 | 11/2002 |
| JP | 2004326211 | 11/2004 |

OTHER PUBLICATIONS

Publication: "Bridging Physical and Virtual Worlds With Electronic Tags", by Roy Want et al, Xerox PARC Papers CHI 99, May 1999, Pittsburgh PA, copyright ACM 1999 0-201-48559-1/99/05 pp. 15-20.

Publication: "Satchel: Providing Access to Any Document, Any Time, Anywhere", by Mik Lamming et al., Xerox Research Centre Europe, ACM Transaction on Computer-Human Interaction, vol. 7, No. 3, Sep. 2000, pp. 322-352.

Publication: "A Historical View of Context" by Matthew Chalmers, The Journal of Collaborative Computing, vol. 999, Special Issue on Context-Aware Computing in CSCW http://www.equator.ac.uk/var/uploads/M.Chalmers2004.pdf retrieved May 16, 2007.

Publication: "The Parctab Ubiquitous Computing Experiment", by Roy Want et al., Technical Report CSL-95-1, Xerox Palo Alto Research Center, Mar. 1995.

Publication: "Activity-Based Information Retrieval: Technology in Support of Personal Memory", by Michael G. Lamming et al., Rank Xerox EuroPARC, www.lamming.com/mik/Papers/air.pdf, retrieved May 16, 2007.

Publication: "Context-Awareness in Wearable and Ubiquitous Computing", by Gregory D. Abowd et al., Proceedings of the First International Symposium on Wearable Computers (ISWC '97), 1997 IEEE.

Publication: "Towards a Better Understanding of Context and Context-Awarenesss", Source, Lecture Notes In Computer Science; vol. 1707, 1999, portal.acm.org/citation.cfm?id=743843 ISBN:3-540-66550-1.

Publication: "Context-Aware Computing Applications" by Bill N. Schilit et al., http://citeseer.ist.psu.edu/schilit94contextaware.html, retrieved May 16, 2007.

Publication: "Just-In-Time Information Retrieval Agents", by B.J. Rhodes et al., vol. 39, Nos. 3 & 4, 2000 MIT Media Laboratory http://researchweb.watson.ibm.com/journal/sj/393/part2/rhodes.html retrieved May 16, 2007.

Publication: "Using Physical Context for Just-In-Time Information Retrieval", by Bradley Rhodes, IEEE Transaction on computers, vol. 52, No. 8, Aug. 2003 pp. 1011 to 1014.

\* cited by examiner

| | |
|---|---|
| ACTIVITY | – ACTIVITY CONSTRUCT AND CONTENT STORED IN THE ACTIVITY<br>– SCHEDULE<br>– PARTICIPANTS<br>– INFERRED ACTIVITY |
| PEOPLE | – ACTIVITY PARTICIPANTS<br>– SOCIAL NETWORK<br>– PEOPLE PUBLISHING RELATED CONTENT (IN PROFILE, POSTINGS, MESSAGES, OR BEHAVIOR) |
| TIME | – CLOCK<br>– SCHEDULE |
| CONTENT | – ASSOCIATED WITH A LOCATION OR A PHYSICAL TAG / QR CODE<br>– PRINTED MEDIA ASSOCIATED WITH VIRTUAL CONTENT REFERENCED BY A LOCATION OR A PHYSICAL TAG / QR CODE<br>– CREATED OR COLLECTED BY THE END USER<br>– ABOUT THE END USER |
| LOCATION | – DETERMINED USING POSITION SENSING SYSTEM (I.E., GPS SYSTEM)<br>– DETERMINED USING PHYSICAL TAGS OR MARKERS OF A KNOWN LOCATION |
| HISTORY | – RECENT LOCATION / ACTIVITY / CONTENT<br>– ROUTINE LOCATION / ACTIVITY / CONTENT |

*FIG. 6A*

METHOD AND APPARATUS FOR FILTERING VIRTUAL CONTENT

BACKGROUND

1. Field of the Invention

Embodiments of the present invention relate to receiving virtual content on a computational device. More specifically, embodiments of the present invention relate to a technique for filtering virtual content received on a computational device according to the user's context.

2. Related Art

The capabilities of mobile devices have increased dramatically in features and performance since their introduction. For example, many mobile devices now provide applications that were at one time solely the province of desktop computers, such as scheduling tools, word processors, email, web browsers, and other software applications. In addition, many mobile devices incorporate functions of electronic devices such as cameras, media players, global position sensors, wireless network connections, and phones.

Because mobile devices are equipped to send and receive information in a number of ways, providers of "virtual content" (i.e., electronically encoded tactile, audio and/or visual information) have already begun to explore the idea of attaching of virtual content to particular places or objects. In other words, the providers of virtual content associate virtual content with a particular place or object and a mobile device delivers the virtual content to a user when the user is in the location or near the object.

For example, Blockies.com provides a service that allows users to take a photo of a location or item with a cameraphone and then mark the location or item with a sticker with a unique ID number. The user then emails the picture and the unique ID number to Blockies.com. Next, Blockies.com links the photo to that location so that other users who walk by later can enter the ID number and see the photo on their phone.

Another example is Bookmark Handover, which is being developed jointly by Connect Technologies and the National Institute of Information and Communications Technology (NICT). This technology allows a user to bookmark information from media, such as TV and magazines, and save the information on a server through his or her mobile phone. The information is saved along with the context information such as location, time, environment, and situation. Then, during subsequent operation, the server compares context information associated with the bookmarked information to each user's current context information (such as that user's location). If the comparison generates a match, the server sends the bookmarked information to the user through mobile phone functions such as e-mail, short messages, video, or audio.

Yet another example is Lavasphere from Gavitec, which allows a camera phone to decode 1D (1-dimensional) or 2D (2-dimensional) barcodes that are linked to online information. When a barcode is read (i.e., photographed and then decoded) by a camera phone, the online information is delivered to the camera phone.

Yet another example is NTT DoCoMo's R-Click service, an area-information service incorporating mobile phones and a "wireless tag" device which enables a user to receive a wide variety of area information as they walk around an area that has been prepared with special "tags."

Yet another example is Digital Graffiti from Siemens, which is an application that allows users to send messages from their mobile phone to a specific location. Other users passing through that location can receive the message.

Yet another example is ShotCode from OP3, which is a special kind of tag that contains a code that can be read by camera phones running free software (akin to the 1D and 2D tag reader from Lavasphere). The codes link the phone to a corresponding URL. Anyone can create their own ShotCode at the ShotCode website.

Yet another example is Yellow Arrow from Counts Media, which is an urban game and interactive forum for people to leave and discover messages and in doing so point out what counts. Users type the number code of an arrow sticker placed in some location into a text-message (SMS) from a mobile phone to the Yellow Arrow number. Other users can retrieve the message by using that arrow's number code.

The above examples illustrate that there exist many different techniques for attaching and receiving virtual content corresponding to physical objects and locations. Unfortunately, even given a well-developed infrastructure for attaching virtual content to physical objects and locations, system designers still face major challenges in providing an acceptable user experience. One of the main challenges is that once it becomes feasible to easily populate a given location with virtual content, that location is likely to become far more cluttered with information demanding the user's attention. As the amount of available information increases, the user can find it more difficult to find the useful information among the clutter.

Hence, what is needed is a method and apparatus for delivering virtual content which does not suffer from the above-mentioned problems.

SUMMARY

Embodiments of the present invention provide a system that selects virtual content. The system starts by receiving or gathering a set of virtual content that includes context data. Next, the system assigns items of virtual content from the set of virtual content to one or more dimensions of context with increasing levels of specificity of user relevance, with at least one of the dimensions of context having two or more levels of user relevance. The system then selects a subset of the set of virtual content based on one or more levels of specificity of one or more dimensions of context and displays the subset of the virtual content to the user.

In some embodiments, the level of user relevance is based on one or more of: (1) the user's profile; (2) the user's context; and (3) the user's activity. In some embodiments, the user's profile indicates the user's history and preferences.

In some embodiments, the system determines the user's context using one or more dimensions of context, wherein the dimensions of context include one or a combination of: (1) a degree of contemporaneousness; (2) a proximity to position; (3) a similarity to environmental conditions; (4) an association with computed inferences about people in proximity or in the user's social network; (5) a similarity to text indicated by user selection or encounter; (6) a similarity to at least one context inferred from information gathered based on an input received from the user; or (7) other information that can be sensed or inferred.

In some embodiments, the system determines the user's activity, wherein the activity is one or a combination of: (1) defined by an input received from the user; (2) inferred from an input received from the user; or (3) inferred from the user's context and behavior.

In some embodiments, assigning items of virtual content from the set of virtual content to one or more dimensions of context includes extracting information from the virtual content and computationally matching the extracted information to at least one of the user's profile, the user's context, or the user's activity to determine a level of user relevance for that virtual content.

In some embodiments, the system adjusts the level of specificity for at least one dimension of context if too much or too little virtual content is selected using a given level of user relevance for the at least one dimension of context. The system selects a subset of the set of virtual content based on the adjusted level of specificity of the at least one dimension of context and displays the subset of the virtual content to the user.

In some embodiments, the system provides the user feedback identifying the levels of specificity of the dimensions of context used to select the subset of the set of virtual content.

In some embodiments, the system displays at least one indicator for adjusting one or more dimensions of context to the user. The system receives adjustments made by the user on the at least one indicator that indicate one or more different levels of specificity of the one or more dimensions of context. The system selects a subset of the set of virtual content based on the one or more different levels of specificity of the one or more dimension of context and displays the subset of the virtual content to the user.

In some embodiments, the adjustment indicator is in a graphical interface, wherein the graphical interface can include a graphical representation of a virtual content filter, a menu, a slider, or a dial. In these embodiments, an adjustment indicator represents at least one dimension of context.

In some embodiments, the virtual content includes one or more of the following: (1) web pages; (2) text files; (3) image files; (4) audio files; (5) video files; or (6) other forms of electronically encoded information, including metadata extracted from such information.

In some embodiments, the virtual content is received or gathered from one or more of the following: (1) advertisers; (2) public or private information services; (3) government entities; (4) individuals; or (5) other entities who create virtual content.

In some embodiments, the virtual content is received on a portable device.

BRIEF DESCRIPTION OF THE FIGURES

FIG. 6A presents a table illustrating data relating to a user's situation and some sources for the data in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Portable Device

Figure 1:
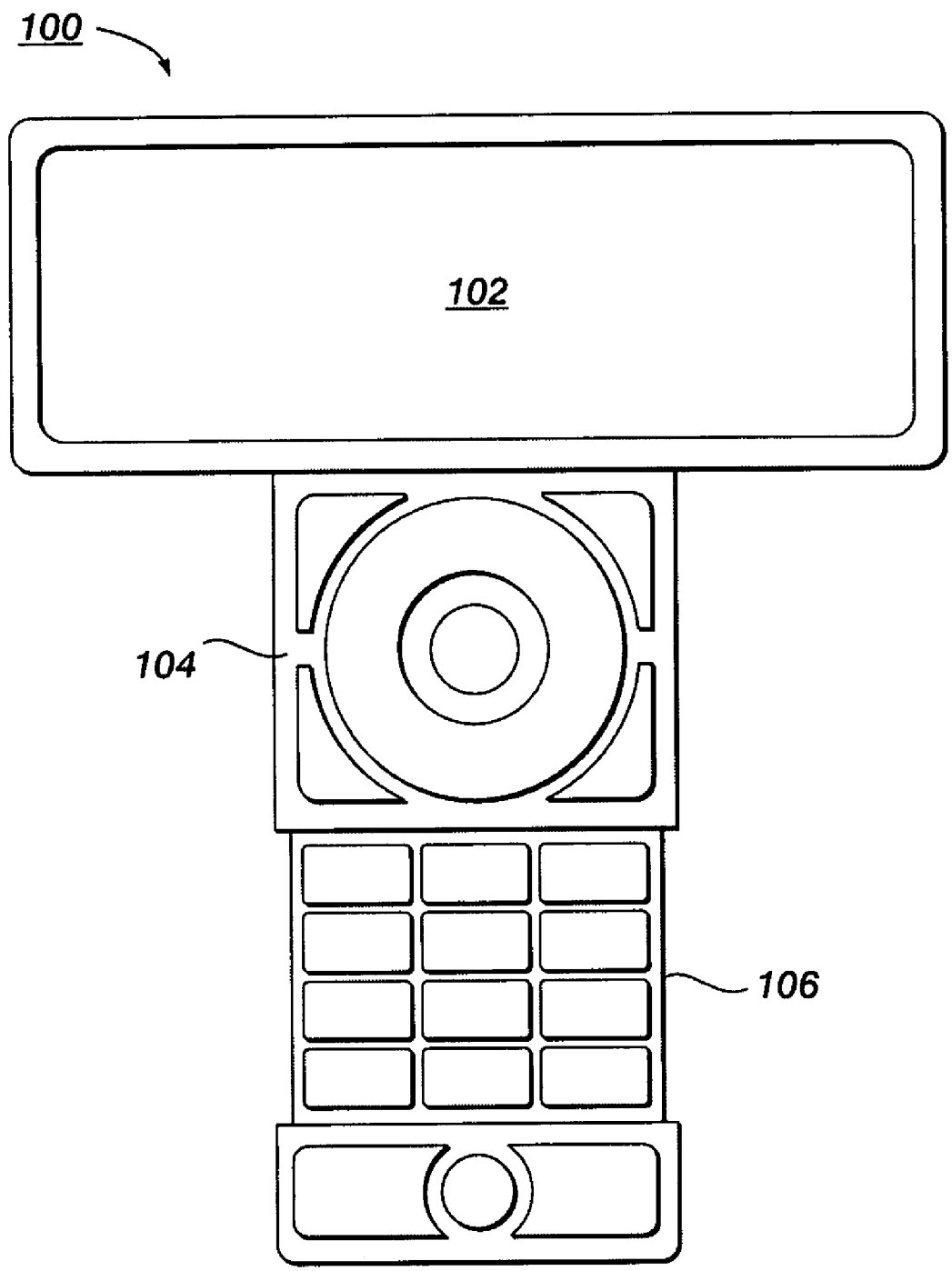
FIG. 1 illustrates a portable device in accordance with embodiments of the present invention.

FIG. 1 illustrates portable device 100 in accordance with embodiments of the present invention. Portable device 100 is a computing device that can receive or gather virtual content. As illustrated in FIG. 1, portable device 100 includes control 104, keypad 106, and display 102. During operation, portable device 100 displays virtual content (i.e., electronically encoded visual information) on display 102, plays the sounds from the virtual content (i.e., electronically encoded audio information) through speakers (not shown), and/or creates sensations from the virtual content (i.e., electronically encoded tactile information) through a vibration device (not shown). The user controls portable device 100 using control 104 and keypad 106. In embodiments of the present invention, display 102 includes a touch-sensitive screen, which allows the user to control portable device 100.

In alternative embodiments of the present invention, portable device 100 is a personal digital assistant, a laptop, a tablet computer, a wearable device, a cellular phone, or another form of suitable portable computing device. In other alternative embodiments, the computing device is a desktop computer, a kiosk, or another form of suitable non-portable computing device. Further, portable device 100 may be part of a networked system in which one or more functions described herein are performed by portable device 100 and one or more functions are performed by a remote computer to which portable device 100 can be coupled intermittently or permanently.

Note that we refer to "virtual content" and "information" interchangeably throughout this description to indicate electronically-encoded tactile, audio and/or visual information received, encountered, gathered, or otherwise acquired by portable device 100. This virtual content can include: web pages, text files, image files, audio files, video files, or other forms of electronically-encoded information. In addition, the electronically-encoded information acquired by portable device 100 can include different types of data, such as: text files with embedded video; image, audio, or video files that include file information (such as an ID3-type tag which can be included with an mp3 file); or other file formats which include metadata such as embedded bibliographic information, digital watermarks, and other relevant information. The electronically-encoded information can be acquired from: a wireless network, a radio network, a cellular network, an Ethernet network, or another suitable network format.

Content Filtering

Figure 2:
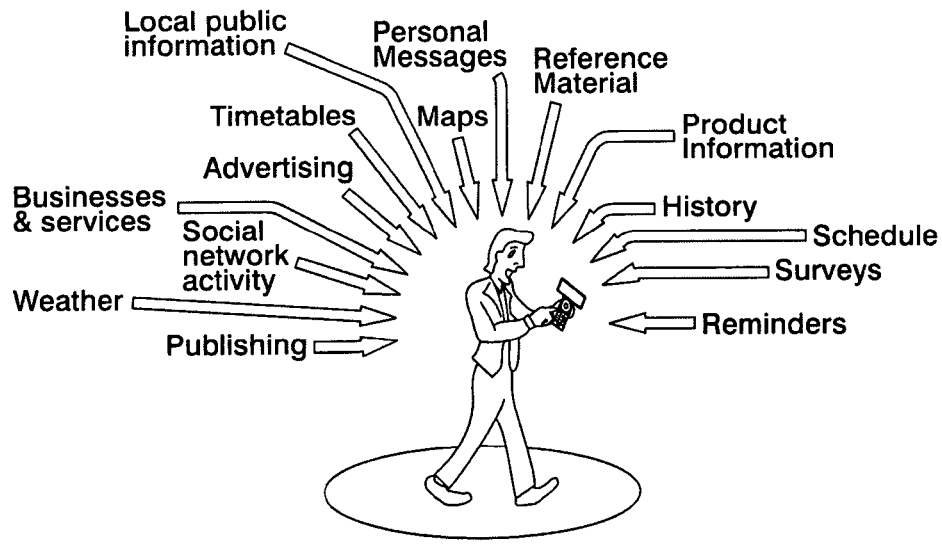
FIG. 2 illustrates a situation experienced by a user of a device that can detect the presence of physically-attached virtual content.

FIG. 2 illustrates a situation experienced by a user of a portable electronic device that can detect the presence of physically-attached virtual content. Since much information can potentially be associated with the location where the user is and the objects in that location, the user may be bombarded by information or unable to see the information of interest due to the existence of too much information. Note that the user is carrying a portable electronic device where screen space is at a premium. Displaying all of the information at once on such a small screen is nearly impossible, and even if the information could be displayed (for example if the user had a large foldable display), the user may encounter difficulty in identifying the truly relevant or interesting information amongst all of the clutter.

Some portable electronic devices only present information to the user when the user manually requests it. However, using this method is non-optimal. With a typical portable electronic device, user interfaces for requesting information either require complicated navigation through menus and submenus to find the right information, or string-based search queries whose results may require additional searching to find the information that the user is looking for. Forming proper queries is hard enough on a personal computer (PC) with a keyboard and mouse, but on a small-screen handheld device forming queries is even more of a problem. Complex information-seeking experiences are frustrating for the user and may discourage the user from using a device to access content.

Figure 3:
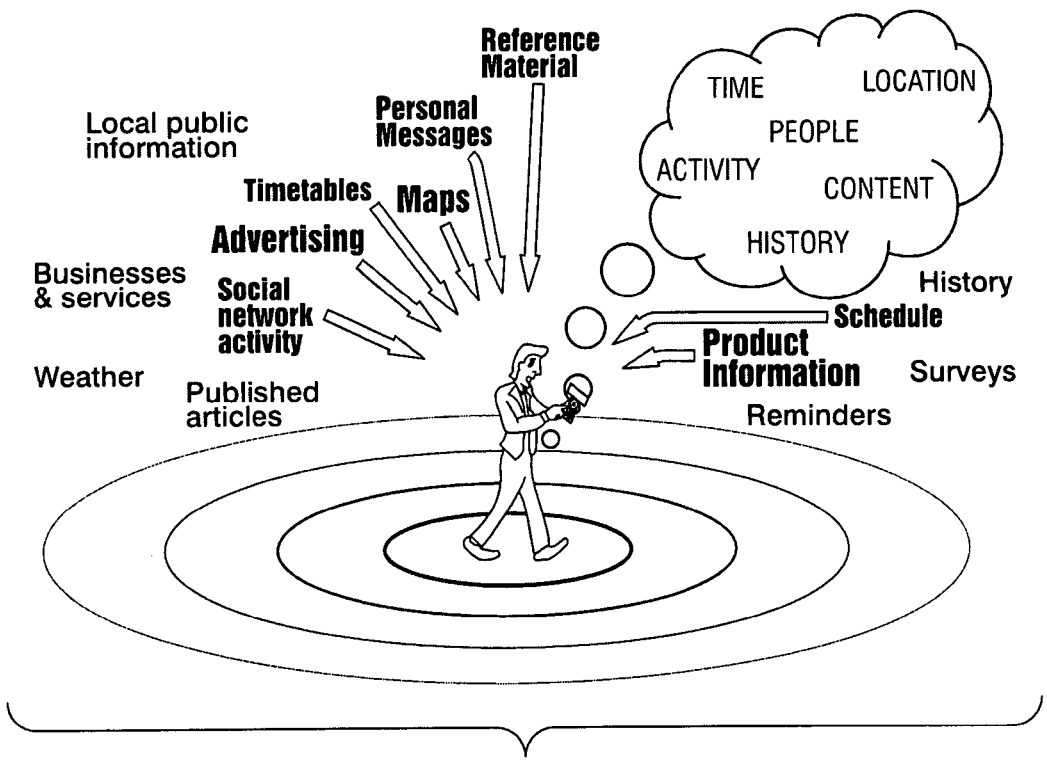
FIG. 3 presents an example of information prioritization in accordance with embodiments of the present invention.

Portable device 100 differentiates content in terms of its potential relevance based on analysis of the user's context, activities, and profile. (We discuss this analysis in more detail in the following sections.) One possible end result of the differentiation is that information is filtered so that information which is relevant to the situation is prioritized. FIG. 3 presents an example of information prioritization in accordance with embodiments of the present invention. In FIG. 3, a user of portable device 100 is engaged in the activity of buying a gift while the user is on the way to meet a colleague, who the user plans to give the gift to. At this point, the user is interested in relevant "advertising" (as shown in bold on FIG. 3) and "product information" and is trying to find his way to places where a suitable gift might be purchased. In this case, the user needs "maps." The user may also need certain "reminders" such as to stop by a particular store the user meant to visit for something else since the user is in the vicinity and has time before his appointment.

Figure 4:
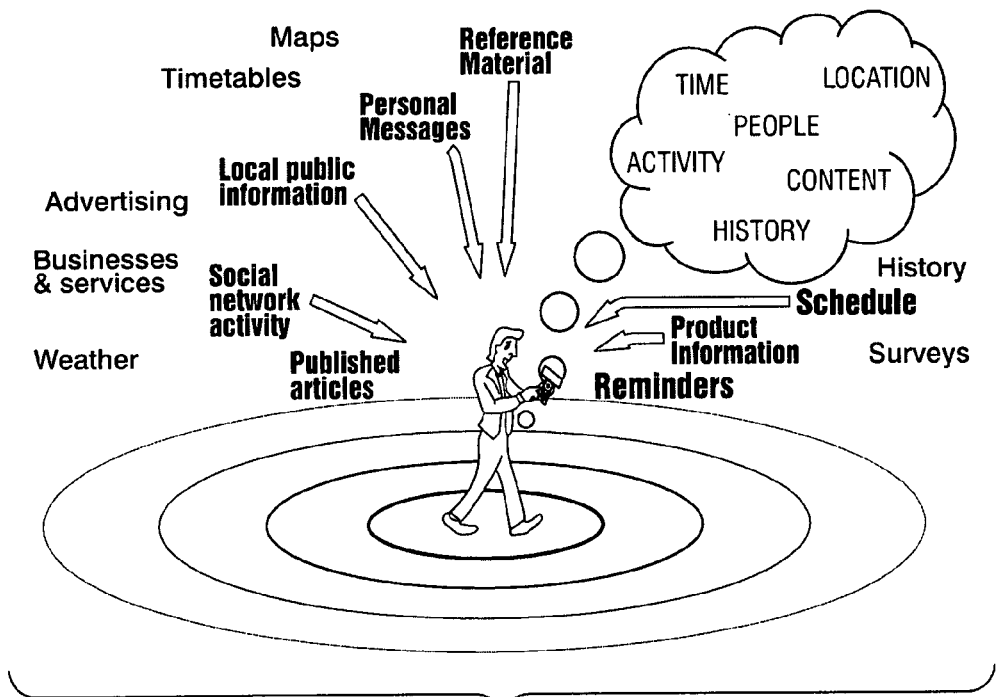
FIG. 4 presents a second example of information prioritization in accordance with embodiments of the present invention.

FIG. 4 presents a second example of information prioritization in accordance with embodiments of the present invention. In FIG. 4, a user of portable device 100 is waiting in line for a table at a popular restaurant at lunchtime. At this point the user may be interested in receiving and dealing with "personal messages" (as shown in bold on FIG. 4) or looking at his "social network" to see if anything interesting is happening with his friends and colleagues. The user may be receptive to suggestions about "published articles" to read or want to search for "local information" about the area around him. Again the user may wish to receive "reminders," for example that the user must pick up his dry cleaning after lunch or the user may want to inspect his "schedule" to see what appointments the user has this afternoon.

A Construct for Filtering by Context

Figure 5:
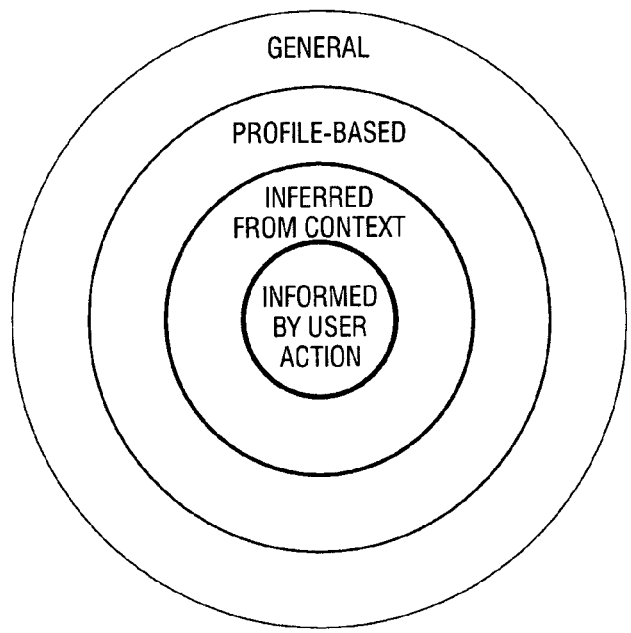
FIG. 5 illustrates a virtual content filter in accordance with embodiments of the present invention.

FIG. 5 illustrates a virtual content filter in accordance with embodiments of the present invention. Using the virtual content filter shown in FIG. 5, portable device 100 selects information which is relevant to the user. Note that relevance diminishes as one moves out from the center of the virtual content filter.

At the center of the virtual content filter (the "informed by user" circle) resides information which is the most relevant to the user. The user can inform the device which information is relevant through a query or an action of some kind. Clearly, information that the user desires is likely to be relevant. The issue is how well the user can express his or her intention to portable device 100. In some cases this is easy (e.g., "show me my calendar") and in other cases this is hard (e.g., "find a good restaurant"). In the former case, there may only be one calendar to which the user could be referring. In the latter case, there is typically a wide range of possible answers.

In alternative embodiments, the information that qualifies for the "informed by user" circle can be inferred by portable device 100. In these embodiments, portable device 100 can automatically make a query or perform an action based on an inference of the what the user's activity might be from what portable device 100 can sense of the user's actions. For example portable device 100 may infer that the user is going out to lunch when the user leaves his or her office at midday. Given this inference, portable device 100 can group received or gathered virtual content relating to restaurants within the "informed by user" circle. (In addition, based on this inference, portable device 100 may make an automatic query regarding restaurants in order to gather the virtual information.)

The next ring out (the "inferred by context" ring) is information that can be inferred as being useful from the user's context. We define context and relevance in more detail below but, for example, if a user is in a particular location and asks for information about good restaurants, then restaurants which are closer are prioritized over restaurants that are further away. In embodiments of the present invention, information presented using this ring includes information the user requests or the device requests based on inferences from the user's actions (i.e., information that is included in the "informed by user" circle). However the ring also includes information that is unrelated to user behavior.

The next ring (the "profile based" ring) is information that matches the user's profile (which in turn includes information in the "informed by user" and "inferred by context" regions, but also information that will not be included in these rings). The user's profile may be based upon information that has been collected and/or inferred over a period of time, or that the user has explicitly entered, such as his or her tastes in music, food, or reading material. So, if a user likes autoracing but not horticulture, then portable device 100 prioritizes the former over the latter. If the user likes sushi and French restaurants best, then portable device 100 prioritizes those restaurants over others.

Finally, we have general information (the "general" ring), which includes anything covered by the three inner rings but also a great deal of unrelated information. Users are still likely to want such information from time to time, but, outside of a specific request, the user is less likely to want such information. (Note that the case where the user makes a specific request may or may not be restricted by any of the circles contained within this ring. The user may want to make an unrestricted general query for anything that matches a query term, similar to the kind that is made using standard search engines.)

The fourth or general ring covers any available virtual content (such as information on the Internet) and hence much of this information is not likely to be relevant.

Note that the third or "profile based" ring is more restrictive to information that is likely to be relevant to the user, and information of this type is already of great interest to commercial organizations seeking to customize services towards individuals. Profile-based information delivery is already common in so-called "recommender systems" such as Amazon.com's, where users see products presented based on their previous buying habits. The second or "inferred from context" ring is even more restrictive and likely to be more relevant because the second ring includes information from the current context (which may change from moment to moment). The first or "informed by user" ring is the most restrictive of all, excluding anything unrelated to the user's profile, current context and ongoing behavior or input to the device 100.

Defining Context

We define "context" technically as data that can be gathered about the user's situation. FIG. 6A presents a table illustrating data relating to a user's situation and some sources for the data used to infer the context (e.g., activity, people, time, content, location, and history) in accordance with embodiments of the present invention. Using one or more of these data items as constraints or queries for desired results can facilitate the filtering out of irrelevant information. Note that "content" (as shown in FIG. 6A) can be both a source and a result of context sensing.

Figure 6B:
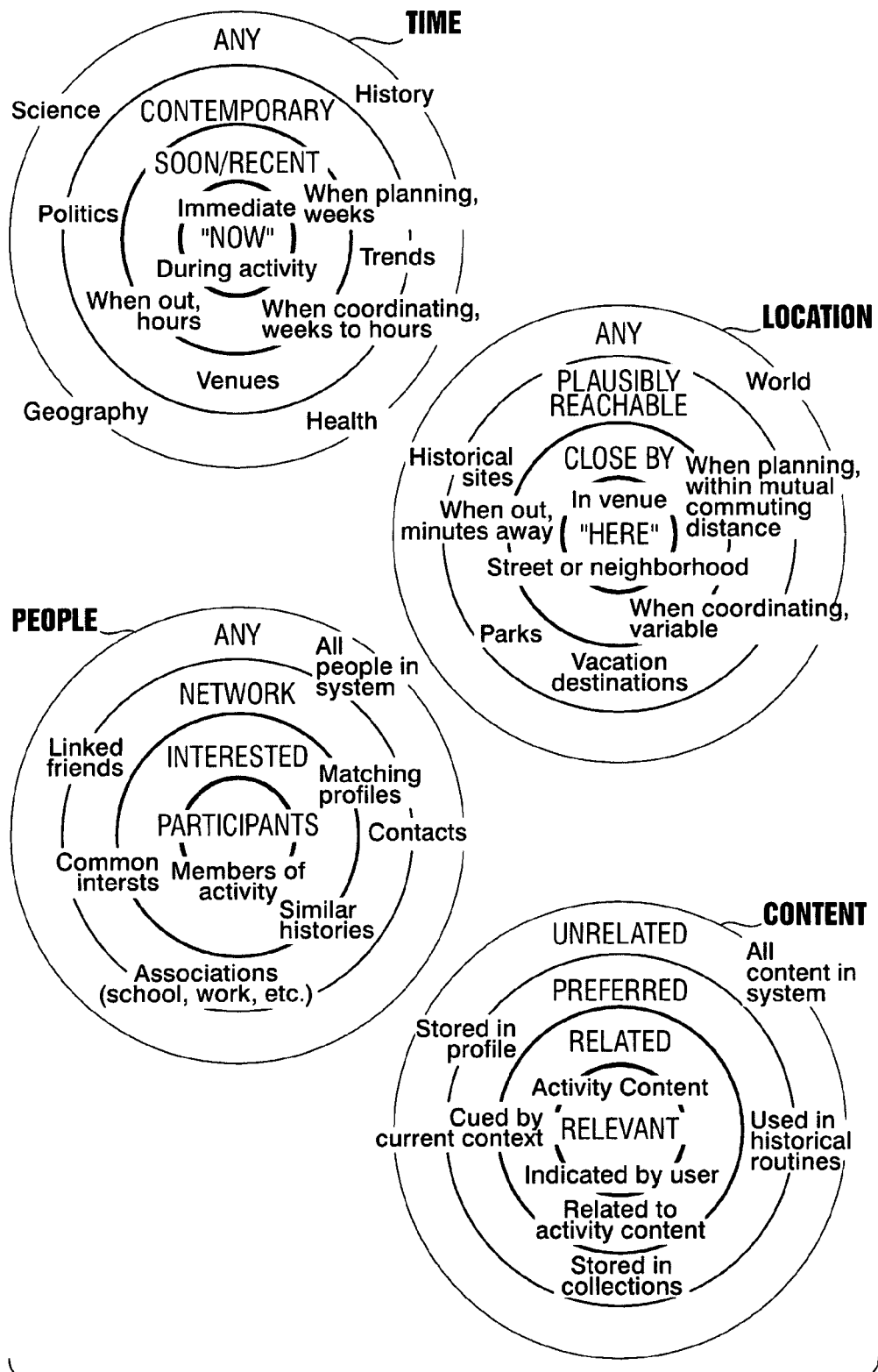
FIG. 6B shows how dimensions of context map onto a virtual content filter in accordance with embodiments of the present invention.

FIG. 6B shows how dimensions of context (e.g., time, location, people and content) can be mapped onto a virtual content filter with one or more levels of specificity in accordance with embodiments of the present invention. (Note that we can think of each ring (or band) of the virtual content filter as specific "dimensional virtual content filters.") In the case of the Time and Location dimensions of context, the central ring is slightly different in character because the central ring can be partly defined by data that are objectively and directly measurable in relation to a user. However, more generally speaking, the definition of a virtual content filter's central ring is contingent on something we are calling an Activity, which we describe below.

The Activity: A Mechanism for Seeding Context

In embodiments of the present invention, an Activity can be inferred from models of human behavior and from what portable device 100 senses from the current context. For example, the model of human behavior may indicate that an inferred Activity labeled "lunch" is more likely to occur as 1 PM approaches and becomes less likely after 2 PM. Hence, if the user walks out of his or her office at 12:30 PM, then portable device 100 infers that lunch is the most likely inferred Activity. If the user walks out of his or her office at 4 PM, the portable device does not make the same inference. In embodiments of the present invention, a designer adds one or more models of human behavior and activities to portable device 100. In alternative embodiments, portable device 100 "learns" (i.e., develops) models of human behavior and activities from computations using data gathered from analyzing the behavior of one or more people or from users of the system. Thus portable device 100 can predict future situations and inferred Activities which have not yet occurred and compute the appropriate definitions of the levels of relevancy for each of the dimensions of context relating to the predicted situations and activities.

Figure 7:
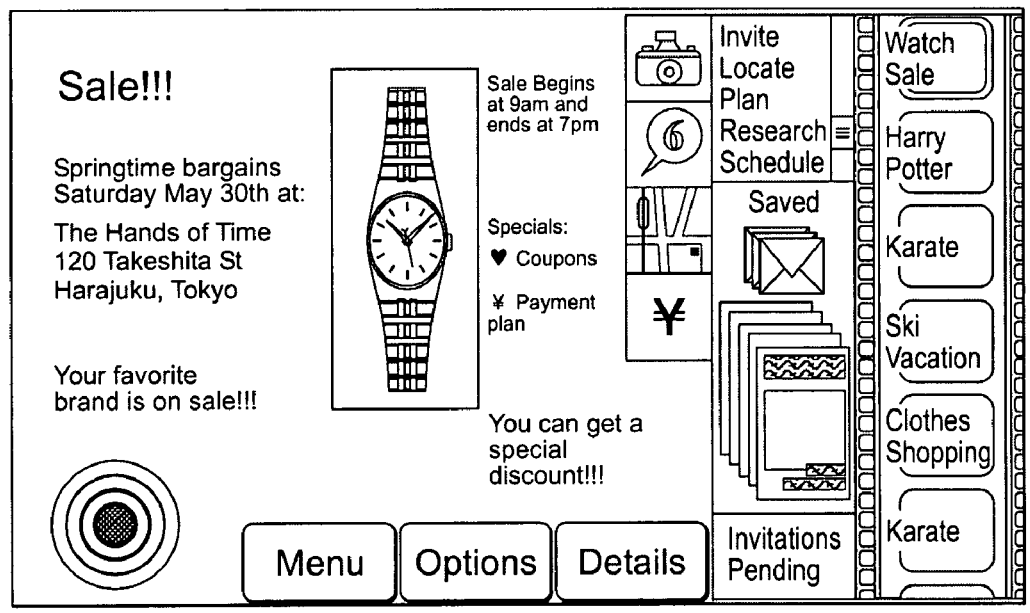
FIG. 7 illustrates a graphical interface displaying information from an Activity in accordance with embodiments of the present invention.

In further embodiments, an Activity may also be embodied as a container (i.e., a data structure) for information that users collect as they plan an activity or just satisfy their curiosity. FIG. 7 illustrates a graphical interface displaying information from a container Activity in accordance with embodiments of the present invention.

Users of portable device 100 may want to be able to store some of the information that they discover for use at a later time. The users may also want to access a previous context or even a future context, where the central rings of the different dimensions of context will not relate to the current situation, just as PC and mobile phone users: store messages and photos on their devices; refer back to old content; and make plans for the future. To this end, a container Activity can be implemented as a technical mechanism with a graphical user interface such as that shown in FIG. 7 for functions such as scheduling, inviting participants, doing research and planning and for containing the content that users collect. This content can then be put into service of a better definition of immediate context through analysis of its text and any metadata that the content may include. A container Activity of this type can be created for a future context of time, location, people and content that has not yet occurred or the container Activity can be used to refer to the past (i.e., history) and thus to a context that is no longer existent.

Portable device 100 may create a new inferred and/or container Activity instance whenever a user saves information that does not go in a pre-existing Activity. Activities come in a range of schemas that include models of the regular characteristics of certain activity types. For example, shopping, dining out, or going to a theme park are all activities that have regular characteristics.

Each of these types of Activity has a different system model associated with it. Shopping, for example, can have many destinations that are visited in a spatially efficient manner (i.e., portable device 100 users typically do not visit one store, then another a kilometer away, and then go back to another store next door to the first store). Shopping often involves one or more purchasing goals and possibly some spontaneous purchases that match a user's tastes. Dining out and going to a theme park involve a single destination, but dining out involves only one meal, whereas going to a theme park may involve trying many different rides.

Given these types of regularities, portable device 100 is either given by a designer or automatically develops a basic schema for likely decisions and actions a portable device 100 user may have to accomplish when planning an activity. The schema is represented at the device 100 user interface as selectable options for actions that are typical for a given activity. Portable device 100 can then offer these as actions from within the Activity. For example, many human activities are likely to involve inviting friends and coordinating a day and time. Shopping is likely to involve finding the best concentration of stores selling items of interest. Dining out is likely to involve choosing a single restaurant and making a reservation. These are options that portable device 100 can present and simplify for the user from within an Activity.

The user can perform these and possibly other more general actions from "inside" an Activity that is occurring now or at some other time, adding further content that portable device 100 can use to define context. For example, if the user looks at their calendar from inside a Shopping Activity, which several friends have been invited (e.g., by messaging from device 100) to take part in, a portable device 100 can use the shopping context to query friends' calendars (without compromising the privacy of those friends by showing their schedules) and suggest an ideal day and time for everyone to go. As another example, a user of portable device 100 could use the shopping context to highlight times in the calendar when the user is free and the store is also open.

An Activity is also like a folder where users can save the information that they either encounter when reading a magazine or when doing research to find out more about something. From the user's point of view, she or he is simply saving or book-marking the information for later reference, but from portable device 100's point of view, the content the user collects helps to define the nature of the Activity. By mining the text in what users collect for any distinctive words or certain keywords or phrases, portable device 100 can use the information to refine its understanding of the goal of the Activity and constrain further queries for information. For example, if the user comes across an advertisement for a watch sale in a particular store and saves that in a Shopping Activity, then portable device 100 can do things like: compiling a list of nearby stores where watches or related items can be bought; finding the quickest route to the store or the shortest route between stores of interest; proposing friends to invite whose profiles suggest they may like to come along; suggesting places to eat after shopping, and so on.

Each activity a user engages in is technically a separate instance of an Activity, so if two shopping expeditions are planned, then two separate Activities are created. This is because they have different times and may also have different locations, different objectives, and different participants. However, a user may want to make a second attempt at shopping to buy something if a first expedition is unsuccessful. In this case, the user may reopen an Activity and reuse information contained in the Activity, but set a new time and location and invite different friends to come along, even though they have already completed a previous outing, or even if the first outing has not yet taken place.

Activities and Virtual Content Filters: How they Relate

As mentioned above, the "Participants" and "Relevant" rings of the "People" and "Content" virtual content filters, respectively, are determined by the inferred or user-specified activity. Since users can invite people to participate in an Activity from within the Activity's options using portable device 100 to send messages or make phone calls, and they can save content in an Activity, portable device 100 can determine the participants and the relevant contents. Alternatively, participation and relevancy can be inferred as can an activity, using data from user behavior such as whom they communicate with and what they read and write on portable device 100.

The "soon/recent" and "close by" second rings of the "Time" and "Location" virtual content filters, respectively, are objectively measurable variables in relation to a user. However, they may also change their actual definitions, depending on whether a user is planning, coordinating, or actually involved in an activity.

When planning an activity (i.e., before the event commences), the extent to which relevant information is specific to the user's current time and place is diminished, so portable device 100 may relax the specificity of the virtual content filter and allow any information relevant to a reasonable commute distance and anything relevant to the forthcoming week or so. If the user specifies a time and place, perhaps by adding a promotion for a specific event to the activity, then portable device 100 may use a more restrictive band of the virtual content filter. If the user specifies that the activity is of a travel or tourism type, then portable device 100 may extend its time and place horizons to allow a wider range of possible destinations (changing "close by" to "reachable"), and may present information that may pertain to travel opportunities (such as discount packages) that are further out in time.

When out-and-about participating in activities, users are more inclined to focus on information that is very specific to where they are and what they are interested in doing now, so portable device 100 uses the more restrictive time and location bands to filter for information relevant to model-based predictions of follow-on activities.

When the participants, the relevant content, the time, and the location are defined, the outer rings of each of the dimensional virtual content filters can also be defined in relation to them. Note that there are associations between the information in different dimensional virtual content filters so that the information in the central ring of one virtual content filter may inform the second ring of another. For example, relevant content in the Content virtual content filter informs the definition of "interested" persons in the People virtual content filter.

The dimensional virtual content filters are break-outs of the general virtual content filter, but their rings do not necessarily exactly map onto the rings of the general virtual content filter. For example, the three inner rings of the Time and Location virtual content filters are really break-outs of the "inferred from context" ring of the general virtual content filter.

Activities provide a core construct for seeding the ever-changing definition of the user's immediate context. Manifested at the center of the virtual content filters presented above, an Activity can be used to provide a precise technical definition for context. In other words, an Activity provides data that portable device 100 can use to improve utility and to provide shortcuts to actions that are otherwise tedious to perform, such as coordinating a social event or planning a route.

Controlling Context-Based Information Filtering

Having described the construct of an Activity and having related the Activity to the virtual content filter construct, we now return to the issue of content filtering to discuss how users might control portable device 100's automatic filtering. Portable device 100 is unlikely to always predict precisely what the user wants, so the user needs some interface for understanding how portable device 100 is filtering the information and some mechanism for overriding portable device 100's filtering.

The virtual content filter construct detailed above can be used not only as a filtering mechanism, but also as a user interface element (i.e., in a graphical interface).

Figure 8:
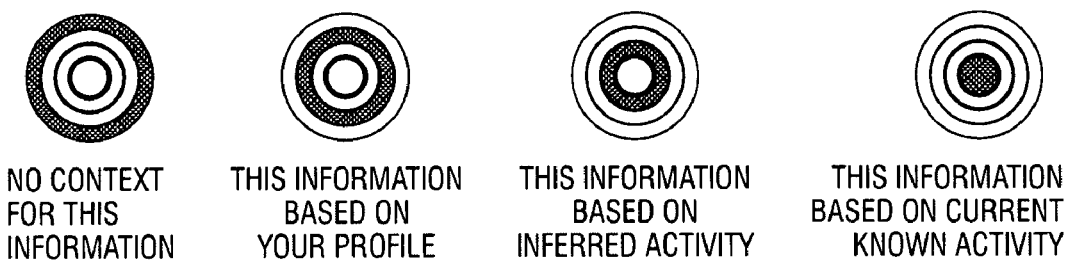
FIG. 8 illustrates a graphical interface that uses a depiction of the virtual content filter to provide feedback about the portable device's current use of context to filter virtual content in accordance with embodiments of the present invention.

FIG. 8 illustrates a graphical interface that uses a depiction of the virtual content filter to provide feedback about portable device 100's current use of context to filter virtual content in accordance with embodiments of the present invention. This presentation allows the user to determine how relevant the presented information is likely to be. In addition, in cases where the user has not provided any information to enable context to be determined, the graphical interface provides encouragement for the user to give portable device 100 more clues as to the context of what they are doing, if the information they see is not very helpful. The user does not need to do anything about this encouragement, but, if they are dissatisfied with the content they see, they at least know that portable device 100 is working with too little data to be of much help and that there is something they could do to improve its performance.

Figure 9:
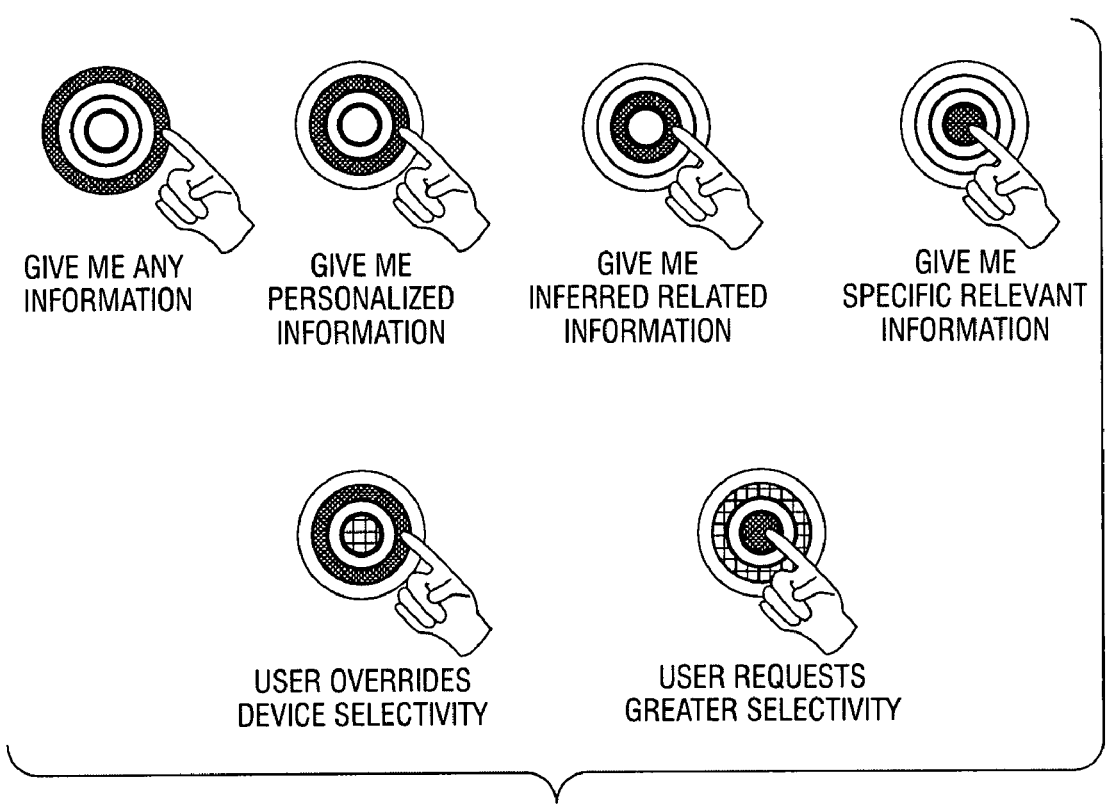
FIG. 9 illustrates using a graphical virtual content filter to control the portable device's automatic information filtering and prioritization in accordance with embodiments of the present invention.

FIG. 9 illustrates different graphical representations of a virtual content filter that can be used on the portable device 100 by the user to adjust the automatic information filtering and prioritization of virtual content in accordance with embodiments of the present invention. As illustrated in FIG. 9, a user can control the level of filtering of the virtual content used by portable device 100 by indicating which band, or combination of bands, of the virtual content filter the user prefers. Alternative embodiments use menus or sliders to control portable device 100's automatic information filtering and prioritization on the various dimensions of context.

Virtual Content Filtering Process

Figure 10:
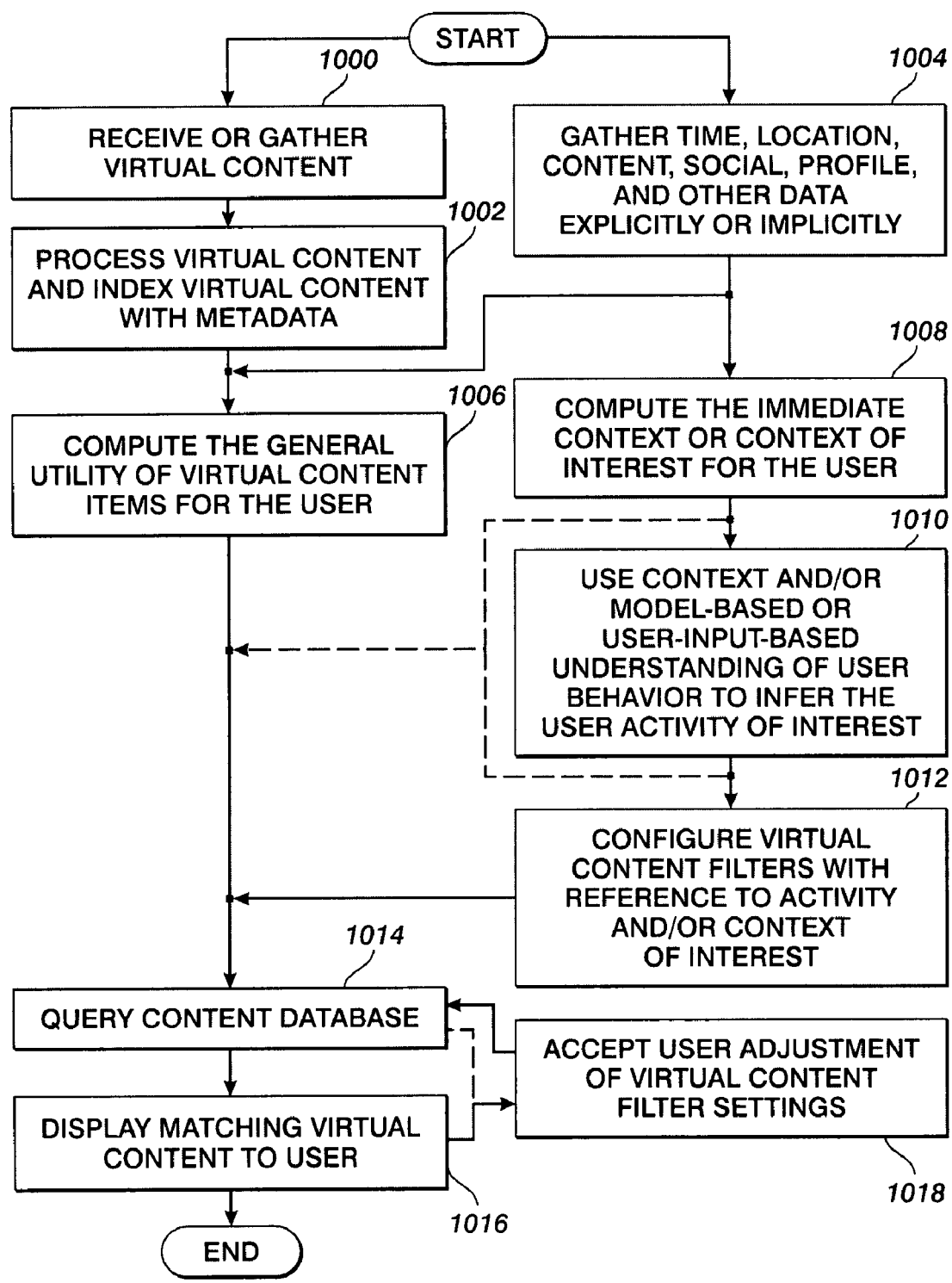
FIG. 10 presents a flowchart illustrating the process of selecting virtual content in accordance with embodiments of the present invention.
Figure 11:
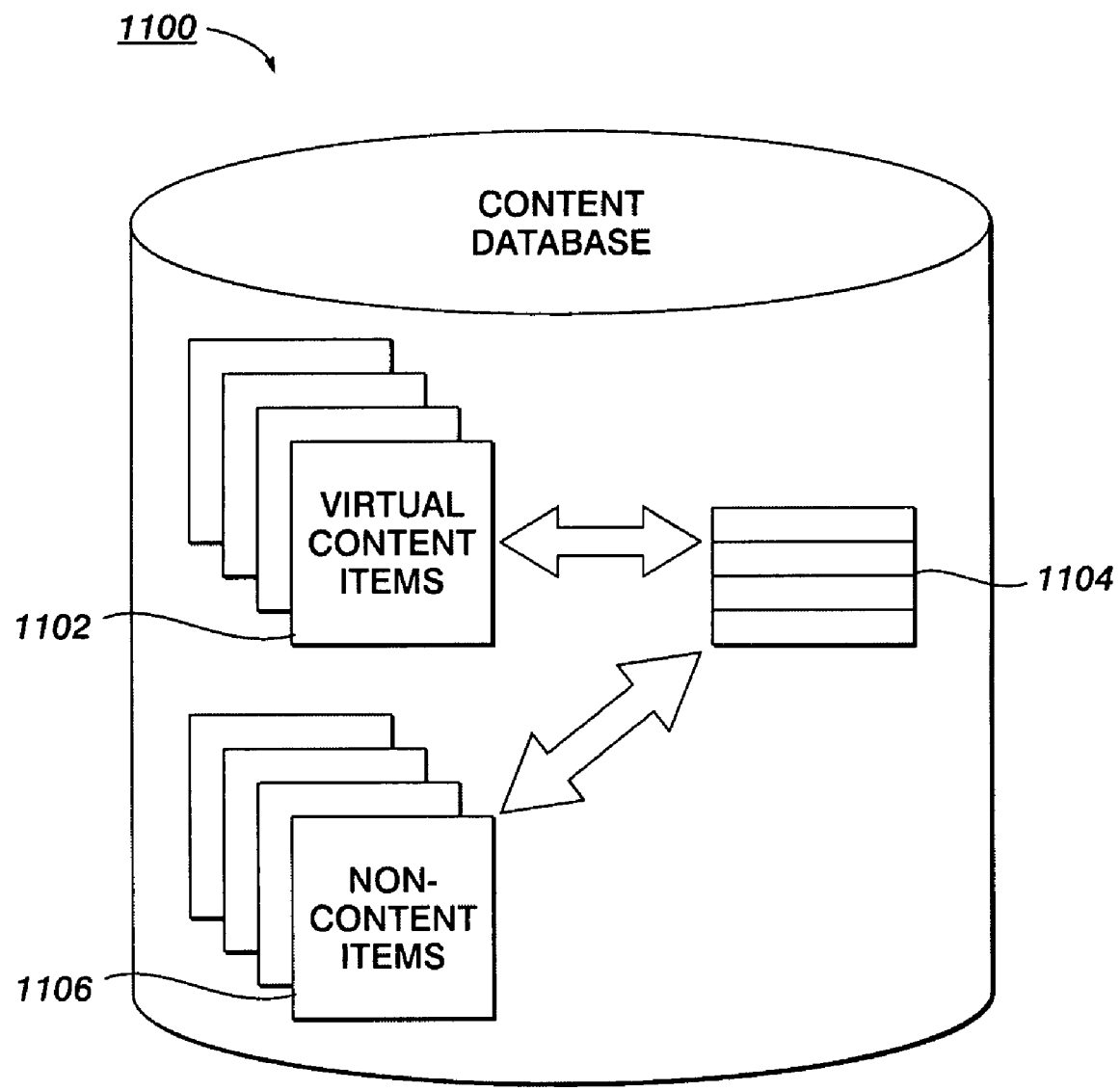
FIG. 11 illustrates a content database in accordance with embodiments of the present invention.

FIG. 10 presents a flowchart illustrating the process of selecting virtual content and FIG. 11 illustrates an associated content database 1100 in accordance with embodiments of the present invention. Note that in some embodiments, each step in the process is performed by portable device 100, while in other embodiments, one or more steps in the process are performed by the system of which portable device 100 is a part.

The process shown in FIG. 10 starts when portable device 100 receives or gathers virtual content items 1102 (step 1000). Portable device 100 receives or gathers virtual content items 1102 (e.g., articles, reviews, advertisements, comments etc., submitted by vendors, publishers or end users or content existing on the World Wide Web or in a proprietary database) from content database 100.

Portable device 100 then processes virtual content items 1102 so that each virtual content item 1102 is assigned a unique identifier (such as a numerical tag) and indexed (through a technique such as computational metadata tagging) with metadata 1104 that characterizes its contents (step 1002). For example, metadata 1104 for any given virtual content item 1102 may include a statistical measure that characterizes the textual or other contents of the item. In addition, metadata 104 can include metadata that refers to contextual information such as location(s), time(s), business (es), person(s) and so on.

Metadata 1104 may also be associated with non-content items 1106 in content database 1100 which are also defined in terms of a unique numerical or other type of tag in content database 1100. Non-content items 1106 may describe businesses and other institutions such as restaurants, stores, theaters, and night-schools. Alternatively, non-content items 1106 may describe items such as products, movies, etc. Virtual content items 1102 may refer to non-content items 1106 within their text. Any of the metadata 1104 associated with virtual content items 1102 may be computed as being more or less closely matched to or the same as that associated with non-content items 1106 stored in database 1100. Non-content items 1106 may also have metadata 1104 that refers to other non-content items 1106, for example, a store item may have metadata 1104 that includes reference to a product item.

Note that the relatedness of virtual content items 1102 and non-content items 1106 in content database 1100 can be determined by portable device 100 by either computing the closeness of the values of the metadata 1104 they share or by association. For example, if one watch store happens to carry a certain brand sunglasses and this is represented in metadata 1104 for that watch store, other watch stores may be associated to that brand of sunglasses by being similar in terms of their metadata 1104 to the first watch store.

For example, a virtual content item 1102 in database 1100 may be an advertisement for a watch sale in Harajuku, Tokyo on Saturday. Metadata 1104 associated with the advertisement may include a statistical description of the text which may capture that the text refers to fashion, accessories, quality, value for money, discounts, a sale, straps, batteries, and so on. The metadata 1104 may also include the business name, the opening hours and days, the address, geospatial location, sale dates, and so on.

Portable device 100 also gathers time, location, sensed content, social profile and other data from the user explicitly (e.g., through user input such as setting preferences) or implicitly (e.g., by detecting and making inferences from user behavior) (step 1004). In doing so, portable device 100 builds up a profile for the user which, after an initial "bootstrapping" period of rapid change, tends to change more and more slowly over time. For example, portable device 100 may infer that the user has certain friends whom he or she contacts often, is very interested in fashion and frequently buys accessories, but also prefers bargains from his or her history of purchases.

Portable device 100 next computes the general utility of virtual content items 1102 in database 1100 for the user (step 1006). When computing general utility, portable device 100 compares data from the profile developed in step 1004 to metadata 1104 to derive a factor that contributes to the computed relevance of each item in the database to the user.

When computing the general content utility, portable device 100 determines a degree of satisfactoriness for each virtual content item 1102 according to the context information gathered in step 1004. In some embodiments, portable device 100 uses a utility function to compute the general content utility for the user. For example, let X be the "consumption set," the set of all mutually-exclusive virtual content that the user could conceivably consume. The user's utility function u: X→R ranks each item of virtual content in the consumption set. If u(x)> or =u(y) (x R y), then the user strictly prefers x to y or is indifferent between x and y. For example, after performing such calculations, the advertisement for a watch sale described above may be computed to have a greater than average relevance to the user, based on the advertisement's metadata matching or being closely related to information stored in the user's profile.

Portable device 100 then uses data gathered in step 1004 to compute the immediate context or context of interest of the user (step 1008). The computed context can include specific time, location, content, social situation, and so on. The computed context is likely to change much more frequently than the user profile computed in step 1004. For example, the user may be in Harajuku in Tokyo on a Saturday afternoon and making slow progress down Takeshita street. Portable device 100 may therefore compute the current sensed context in terms of time and location. If the user scans a physical tag on a product, associated virtual content items 1102 may contribute to the definition of context.

Portable device 100 next uses the context computed in step 1008 and/or its model- or user-input-based understanding of user behavior to infer the user activity of interest (step 1010). Again, the computed activity inference is likely to change more rapidly than the user profile computed in step 1004. To continue with our example, portable device 100's user model may associate shopping activity with the context of the Harajuku location, Saturday afternoons, and slow pedestrian motion and thus be able to match this activity to the current sensed context.

Alternatively, the user may be communicating in email about plans to go shopping in Harajuku with friends on Saturday afternoon. Portable device 100 may use email text as data to predict a future shopping activity from any relevant contextual characteristics extracted from the email text; time, location, store names, and other content from the messages sent and received. Portable device 100 may infer that the friends are also likely to come along. If the user or his or her friends mention fashion, accessories, quality, value for money, discounts, a sale, straps, batteries, and so on, in their email, a goal of the shopping activity can also be inferred.

Portable device 100 then configures its virtual content filter(s) with reference to activity or context of interest (step 1012). Portable device 100 configures the virtual content filters as precisely as possible, given the inferences about the user's context and activity (either current or of interest) from steps 1008 and 1010.

In some embodiments of the present invention, when one or more of profile data, context data, and activity data is not available, portable device 100 may operate using only the available data to the extent possible to configure the virtual content filters. More specifically, the computations in steps 1006, 1008, and 1010 may adapt to use the most recently available data if one or more types of data cannot be updated in step 1004. For example, if no data is available to be used by a corresponding step (such as when data cannot be gathered or is out of date), the step returns a null value and exerts no influence on content filtering. For instance, if the user activity of interest can not be computed due to a lack of context and user behavior data, step 1010 returns a null value and hence exerts no influence on content filtering.

Portable device 100 next queries the content database 1100 (step 1014). When querying content database 1100, portable device 100 performs a filtered query over the subset of the virtual content items 1102 having a certain level of utility for the user (where the level of utility was determined in steps 1000, 1002, 1004 and 1006). The search for relevant content may be further constrained to just items in the nearby vicinity. Techniques for limiting the search space produce a more efficient search over the entire content in the database, enabling a faster response time during any given query. This allows the queries to occur on a regular basis without unduly impacting portable device 100's performance. In our example, one of the items retrieved may be the Harajuku watch sale because the sale is close by and matches the context and the activity of interest together with the user's profile.

As another example, the user might scan a QR tag on a new sports car at a dealer's lot. Portable device 100 can then gathers virtual content items 1102 not only related to the scanned QR tag (i.e., related to the sports car), but also local virtual content items 1102 associated with sports cars (e.g., information about the other sports cars in the sports car's class, insurance and financing costs, or even a local sports car race event coming up soon).

As yet another example, if the user is using portable device 100 to purchase movie tickets for a movie at a theater in the City that evening, portable device 100 may determine from the user's input that the user's activity at that time will be "watching a movie" and may infer that if the user is at home in the suburbs as the movie's start time approaches, the user's next activity will be "commuting into the City."

Portable device 100 then displays the best matching virtual content items 1102 from database 1100 to the user (step 1016). In some embodiments, the matching virtual content items 1102 are displayed in order of closeness of match to the current context or activity. In alternative embodiments, the matching virtual content items 1102 can be displayed in a way that introduces new or less exactly matching items into the set of displayed virtual content items 1102 (because the user may not want to see the same items again and again). Continuing our example, the Harajuku watch sale may be the closest match to the user's profile, context, and activity and may therefore be displayed at the top of a list of items that the user might select to view.

Portable device 100 can accept a user override of the automatic virtual content filter configurations (step 1018). The user enters such an override by interacting with a graphical interface as described above. Entering an override causes portable device 100 to make a new query on content database 1100 and may force portable device 100 to ignore the general content utility for the user calculated in step 1006. Portable device 100 then returns to step 1016 to display the new results.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selecting virtual content at a user device, comprising:
   receiving a set of virtual content at the device;
   receiving context data related to the user's context at the device;
   determining context of interest for the user from the received context data
   using the context data and a model of user behavior to infer current user activity of interest;
   configuring one or more virtual content filters by assigning items of virtual content from the set of virtual content to one or more dimensions of the context with increasing levels of specificity of user relevance, with at least one dimension of the context having two or more levels of user relevance, wherein the assigning is based on at least one of the context of interest for the user and the inferred user activity;
   selecting a subset of the set of virtual content based on the one or more configured content filters; and
   displaying the subset of the virtual content to the user at the device.

2. The method of claim 1, wherein the levels of user relevance are based on one or more of: the user's profile, the user's context, and the user's activity.

3. The method of claim 2, wherein the user's profile indicates the user's history and preferences.

4. The method of claim 1, wherein the method further comprises determining the user's context using one or more dimensions of context, wherein the dimensions of context include one or a combination of:
   a degree of contemporaneousness;
   a proximity to position;
   a similarity to environmental conditions;
   an association with computed inferences about people in proximity or in the user's social network;
   a similarity to text indicated by user selection or encounter;
   a similarity to at least one context inferred from information gathered based on an input received from the user; or
   other information sensed or inferred by one or more computers.

5. The method of claim 4, wherein the current user activity of interest is one or a combination:
   defined by an input received from the user;
   inferred from an input received from the user; or
   inferred from the user's context and behavior.

6. The method of claim 5, wherein selecting the subset of the virtual content includes extracting information from the virtual content and computationally matching the extracted information to at least one of the user's profile, one or more of the user's context, or the user's activity to determine a level of user relevance for the virtual content.

7. The method of claim 1, wherein the method further comprises:
  adjusting a level of specificity for at least one dimension of context if too much or too little virtual content is selected using a given level of user relevance for the at least one dimension of context; and
  performing the selection and display operations.

8. The method of claim 1, wherein the method further comprises providing the user feedback identifying the levels of specificity and the dimensions of context used to select the subset of the set of virtual content.

9. The method of claim 1, wherein the method further comprises:
  displaying to the user at least one adjustment indicator for adjusting one or more dimensions of context;
  receiving an adjustment made by the user on the at least one adjustment indicator that indicates one or more different levels of specificity of the one or more dimensions of context;
  selecting a subset of the set of virtual content based on the one or more different levels of specificity of the one or more dimension of context; and
  displaying the subset of the virtual content to the user.

10. The method of claim 9 wherein the at least one adjustment indicator is in a graphical interface, wherein the graphical interface can include a graphical representation of a virtual content filter, a menu, a slider, or a dial, and wherein at least one dimension of context is represented by the at least one adjustment indicator.

11. The method of claim 1, wherein the virtual content includes one or more of the following:
  web pages;
  text files;
  image files;
  audio files;
  video files; or
  other forms of electronically encoded information, including metadata extracted from such information.

12. The method of claim 1, wherein the virtual content is received from one or more of the following:
  advertisers;
  public or private information services;
  government entities;
  individuals; or
  other entities who create virtual content.

13. The method of claim 1, wherein the virtual content is received on a portable device.

14. A computational apparatus for selecting virtual content at a user device, comprising:
  a database for storing a set of virtual content and context data related to the user's context;
  a processor communicating with the database, wherein the processor is configured to:
    determine context of interest for the user from the context data;
    use the context data and a model of user behavior to infer current user activity of interest;
    configure one or more virtual content filters by assigning the set of virtual content to one or more dimensions of the context with increasing levels of specificity of user relevance, with at least one dimension of the context having two or more levels of user relevance, wherein the assigning is based on at least one of the context of interest for the user and the inferred user activity; and
    select a subset of the set of virtual content based the one or more configured content filters; and
  a display for displaying the subset of the virtual content from the database to the user.

15. An apparatus for selecting virtual content at a user device, comprising:
  a receiving mechanism configured to receive a set of virtual content;
  the receiving mechanism further configured to receive context data related to a user's context;
  a determining mechanism configured to determine context of interest for the user from the received context data;
  an inferring mechanism configured to use the context data and a model of user behavior to infer current user activity of interest;
  a configuring mechanism for configuring one or more virtual content filters by assigning items of virtual content from the set of virtual content to one or more dimensions of the context with increasing levels of user relevance, with at least one dimension of the context having two or more levels of user relevance, wherein the assigning is based on at least one of the context of interest for the user and the inferred user activity;
  a selecting mechanism configured to select a subset of the set of virtual content based on the one or more configured content filters; and
  a displaying mechanism configured to display the subset of the virtual content to the user.

16. The apparatus of claim 15, wherein the levels of user relevance are based on one or more of: the user's profile, the user's context, and the user's activity.

17. The apparatus of claim 16, wherein the user's profile indicates the user's history and preferences.

18. The apparatus of claim 15, wherein the determining mechanism is further configured to determine the user's context using one or more dimensions of context, wherein the dimensions of context include one or a combination of:
  a degree of contemporaneousness;
  a proximity to position;
  a similarity to environmental conditions;
  an association with computed inferences about people in proximity or in the user's social network;
  a similarity to text indicated by user selection or encounter;
  a similarity to at least one context inferred from information gathered based on an input received from the user; or
  other information sensed or inferred by one or more computers.

19. The apparatus of claim 18, wherein the determining mechanism is further configured to determine the user's activity, wherein the user's activity is one or a combination of:
  defined by an input received from the user;
  inferred from an input received from the user; or
  inferred from the user's context and behavior.

20. The apparatus of claim 19, wherein when selecting the subset of the virtual content, the selecting mechanism is configured to extract information from the virtual content and computationally match the extracted information to at least one of the user's profile, one or more of the user's context, or the user's activity to determine a level of user relevance for that virtual content.

21. The apparatus of claim 15, further comprising an adjusting mechanism configured to adjust a level of specificity for at least one dimension of context if too much or too little virtual content is selected using a given level of user relevance for the at least one dimension of context;
  wherein after the adjustment mechanism adjusts the level of specificity for the at least one dimension of context, the selecting mechanism is configured to select a subset of the set of virtual content based on one or more levels of specificity of one or more dimensions of context and the displaying mechanism is configured to display the subset of the virtual content to the user.

22. The apparatus of claim 15, further comprising a feedback mechanism configured to provide the user feedback identifying the levels of specificity and the dimensions of context used to select the subset of the set of virtual content.

23. The apparatus of claim 15, further comprising a user-adjustment mechanism configured to:
- display to the user at least one adjustment indicator for adjusting one or more dimensions of context;
- receive an adjustment made by the user on the at least one adjustment indicator that indicates one or more different levels of specificity of the one or more dimensions of context;
- adjust the level of specificity for the one or more dimensions of context to the one or more different levels of specificity based on the adjustment made by the user,
- wherein after the user-adjustment mechanism adjusts the level of specificity for the one or more dimensions of context, the selecting mechanism is configured to select a subset of the set of virtual content based on the one or more different levels of specificity of one or more dimensions of context and the displaying mechanism is configured to display the subset of the virtual content to the user.

24. The apparatus of claim 23 wherein the adjustment indicator is in a graphical interface, wherein the graphical interface can include a graphical representation of a virtual content filter, a menu, a slider, or a dial, and wherein at least one dimension of context is represented by an adjustment indicator.

25. The apparatus of claim 15, wherein the virtual content includes one or more of the following:
- web pages;
- text files;
- image files;
- audio files;
- video files; or
- other forms of electronically encoded information, including metadata extracted from such information.

26. The apparatus of claim 15, wherein the apparatus is a portable device.

* * * * *